United States Patent [19]

Stupeck et al.

[11] Patent Number: 4,866,554
[45] Date of Patent: Sep. 12, 1989

[54] AUTOMATIC HEAD RETRACT SYSTEM FOR DISK DRIVE

[75] Inventors: Donald G. Stupeck, Canoga Park; Gaston A. Palombo, Agoura; Ara W. Nazarian, Glendale; Hugh K. Gagnier, Sherman Oaks, all of Calif.

[73] Assignee: Peripheral Technology, Inc., Newbury Park, Calif.

[21] Appl. No.: 224,077

[22] Filed: Jul. 25, 1988

Related U.S. Application Data

[62] Division of Ser. No. 929,916, Nov. 6, 1986, Pat. No. 4,786,995.

[51] Int. Cl.[4] .................. G11B 21/02; G11B 5/54
[52] U.S. Cl. ................................ 360/105; 360/75
[58] Field of Search ............ 360/104, 105, 106, 109, 360/75

[56] References Cited

U.S. PATENT DOCUMENTS

| | | | |
|---|---|---|---|
| 4,371,903 | 2/1983 | Lewis | 360/75 |
| 4,375,070 | 2/1983 | Isozaki et al. | 360/105 X |
| 4,786,995 | 11/1988 | Stupeck et al. | 360/75 |

Primary Examiner—John H. Wolff
Attorney, Agent, or Firm—Frielich, Hornbacker, Rosen & Fernandez

[57] ABSTRACT

An automatic head retract system for a disk drive. The system operates in response to electric power turn off to retract the heads to a landing zone on the disk surface. The heads are retracted by operating a positioner motor under the control of logic internal to the disk drive unit without intervention by a host computer. The positioner motor comprises a multiphase DC brushless motor which, after power loss, is supplied with current from a capacitor charged during normal drive usage, and by the back EMF of a spindle motor. A latch mechanically locks the heads in the landing zone.

1 Claim, 6 Drawing Sheets

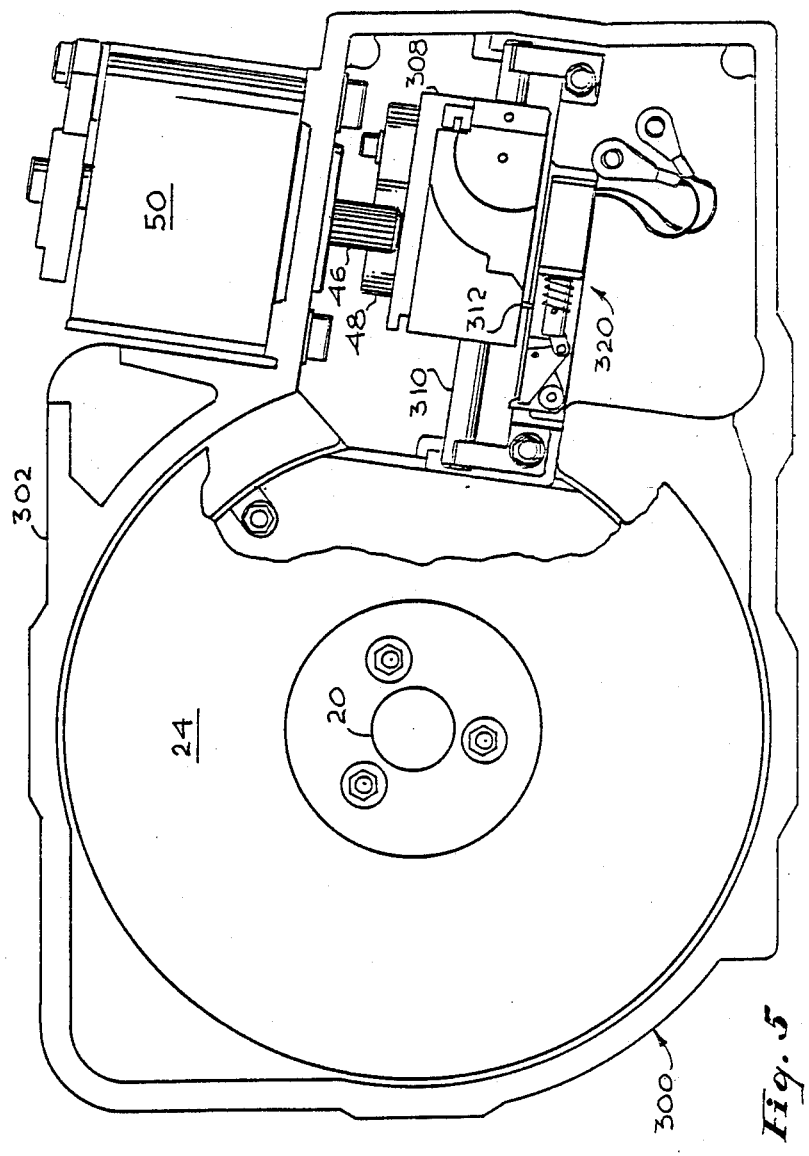

AUTOMATIC HEAD RETRACT SYSTEM FOR DISK DRIVE

This is a divisional of co-pending application Ser. No. 929,916 filed on Nov. 6, 1986, now U.S. Pat. No. 4,786,995.

BACKGROUND OF THE INVENTION

This invention relates generally to hard disk drives of the type generally used with microcomputers for storing digital data and more particularly to improvements therein for automatically retracting the drive read/write heads on power turn off or in the event of an emergency condition, such as loss of electric power.

Hard or rigid disk drives (frequently referred to as "Winchester drives") are used extensively in computer systems for storing digital data. Such drives are characterized by the use of one or more rigid disks or platters mounted on a common spindle for rotation relative to a positioner assembly. The positioner assembly typically comprises a carriage carrying a comb-like structure having a plurality of fingers projecting toward said spindle. Each finger carries a read/write head adjacent to a disk surface for writing data thereon or reading data therefrom. The carriage is typically mounted for substantially radial movement relative to the spindle to position the heads adjacent to a selected disk surface track.

In modern disk drives, the heads are operated very close to the disk surfaces to achieve satisfactorily high recording densities; e.g. approximately 12 thousand bits per inch and one thousand tracks per inch. To accomplish this, a typical head is mounted so as to "fly" very close to the disk surface on a thin layer of air, acting as a bearing, produced as a consequence of the disk surface motion. The head mounting means, which usually includes means for loading or biasing the head toward the disk surface against the air bearing, depends upon the disk surface motion to keep the head flying. When the spindle speed is lower than that necessary to sustain the air bearing, (typically, about ⅔ normal spindle speed), the head no longer flies and thus comes into direct contact with, and drags along, the disk surface. This dragging which occurs both during spindle start-up and spindle turn-off whenever the spindle speed is less than the minimum flying speed, can permanently damage the disk surface.

In order to minimize the effect of disk surface damage, it is prudent to design the disk drive so that the head will always land in a nondata zone (landing zone) of the disk surface. It is additionally prudent to design the disk drive to minimize the duration during which the spindle speed is below flying speed. That is, it is preferable to operate the drive so that the spindle is quickly accelerated up to flying speed during start-up and quickly decelerated to rest during turn-off (attributable to either planned or inadvertant loss of electric power).

Virtually all modern disk drives incorporate some means for avoiding head crashes against a data zone portion of the disk surface, when electric power is lost. For example, U.S. Pat. No. 4,371,903 discloses an emergency head retract system characteristic of the prior art for unloading a head driven by a single winding linear motor positioner. More specifically, U.S. Pat. No. 4,371,903 discloses a system which utilizes the kinetic energy of the spindle motor to provide the energy required to unload the heads by switching the spindle motor windings directly to the linear motor positioner coil.

SUMMARY OF THE INVENTION

The present invention is directed to an improved automatic head retract system particularly useful in a disk drive unit employing a brushless multiphase positioner motor.

A head retract system in accordance with the invention operates in response to electric power turn off (whether intentional or attributable to an emergency condition involving electric power loss) to retract the heads to a landing zone on the disk surface. The heads are automatically retracted by operating the positioner motor under the control of logic within the disk drive unit, without any intervention by the host computer, so as to control the speed of the carriage to avoid high speed crashing against its travel limit.

In accordance with the invention, a capacitor means is charged during normal disk drive operation so as to be able to supply power to the control logic after the loss of external electric power for commutating the positioner motor drive switch means, in order to properly energize the positioner motor windings.

In accordance with an important aspect of the invention, during the head retract operation, the back EMF generated by the coasting spindle motor is used to maintain the charge on the capacitor means and to supply power to the positioner motor. In the preferred embodiment, the spindle motor drive switch means is controlled so as to effectively rectify the current produced by the spindle motor to thus charge the capacitor means.

In accordance with a further aspect of the preferred embodiment, the current supplied by the capacitor means to the positioner motor windings is chopped at a high rate to minimize power consumption and facilitate the maintenance of a charge on the capacitor means.

In accordance with a still further aspect of the invention, a latch mechanism is provided to lock the carriage at the landing zone position to thus avoid damage to the heads, as might be caused by movement or vibration, particularly where the drive unit is used in a portable microcomputer. The latch mechanism is preferably configured to automatically capture and lock the carriage when the heads are at the landing zone without requiring any electric power. The latch mechanism can be released by a short electric pulse supplied to a latch mechanism solenoid.

In accordance with the preferred embodiment, the latch mechanism is mounted inside the head disk assembly adjacent to the path of carriage movement to enable the mechanism to be actuated by a pin carried by the carriage. Actuation of the latch mechanism acts to capture the pin and thus lock the carriage in place. The latch mechanism can thereafter be reset by applying an electric pulse to a solenoid in the latch mechanism.

In accordance with a still further aspect of the preferred embodiment, the spindle motor drive switch means is operated to short circuit the spindle motor windings for braking the spindle motor after the carriage arrives at the landing zone position to minimize subjecting the heads to low speed unstable flight.

In accordance with a still further aspect of the preferred embodiment, the disk surface is organized so that the data zone comprises an outer band and the landing zone comprises an inner band proximate to the spindle so that any static friction between the head and disk surface will not significantly affect spindle starting torque.

BRIEF DESCRIPTION OF THE FIGURES

FIG. 5 is a plan view partially broken away, showing a latch mechanism in accordance with the invention useful for automatically locking the carriage at the landing zone position;

DESCRIPTION OF PREFERRED EMBODIMENT

Figure 1:
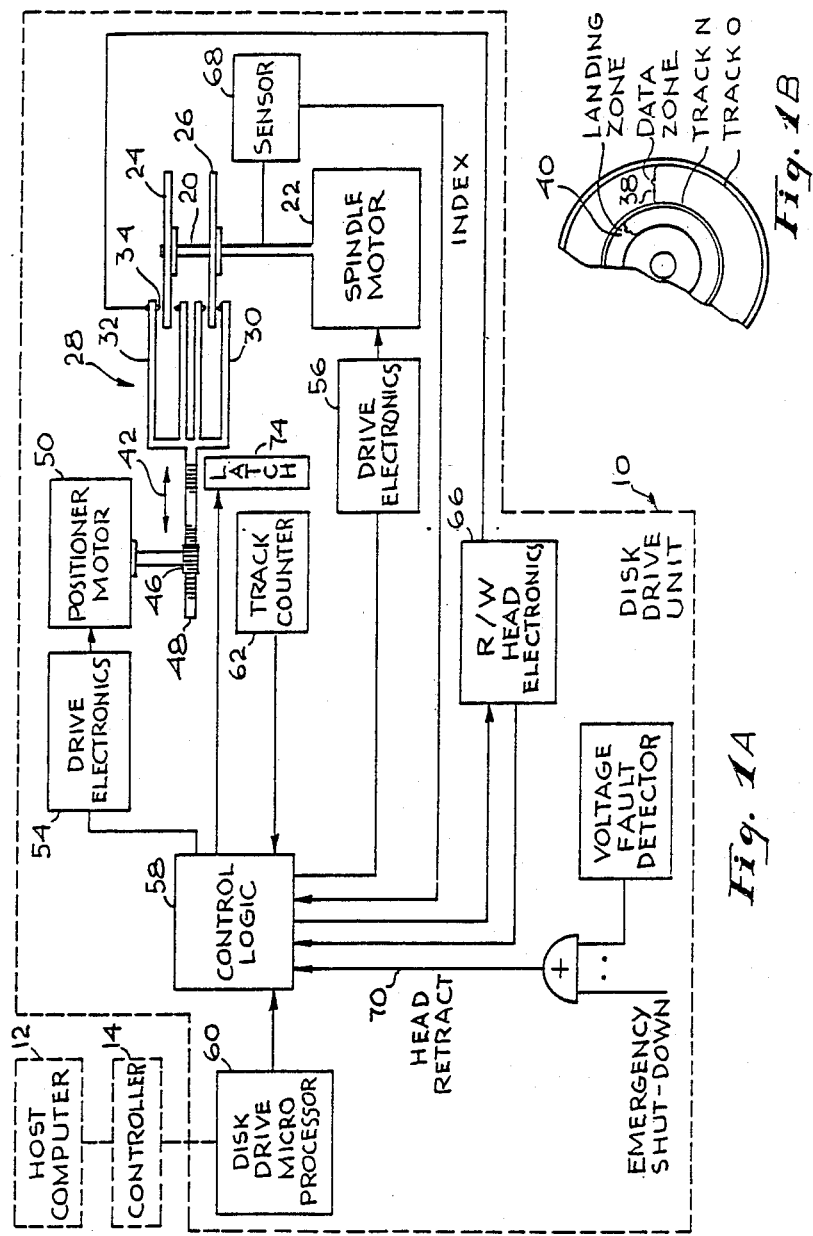
FIG. 1A is a block diagram of a disk drive unit in accordance with the present invention and FIG. 1B is a schematic representation of a disk used in FIG. 1A.

Attention is initially directed to FIG. 1A which comprises a simplified block diagram of a disk drive unit 10 in accordance with the present invention. The drive unit 10, in a typical application, operates in conjunction with a host microcomputer 12 via an interface or controller unit 14 in a conventional manner. The present invention relates to improvements within the disk drive unit 10 for responding to a power turn off or emergency power loss (hereinafter, "voltage fault") to shut down the disk drive unit without destroying data or damaging a head or disk surface.

The disk drive unit 10 is comprised of a spindle 20 which is rotatably driven by a multiphase DC brushless spindle motor 22. One or more disks 24, 26 are mounted on the spindle 20 for rotation therewith. A comb-like positioner assembly 28 is mounted adjacent to the disks 24, 26 for substantially linear reciprocal movement toward and away from the spindle 20. The positioner assembly 28 includes forwardly projecting fingers 32, each finger carrying a head 34 for reading and/or writing data onto a surface.

For reasons to be discussed hereinafter, each disk surface is organized (FIG. 1B) to include a data zone comprising an outer annular band 38 and a landing zone comprising an inner annular band 40. Multiple concentric tracks (i.e. track 0 - track N) are written onto the data surface within the data zone 38.

The positioner assembly 28 is mounted for linear reciprocal movement toward and away from the spindle 20, as is represented by the arrowheads 42 in FIG. 1A. As an example, the positioner assembly 28 can be moved by a rotatable pinion 46 engaged with a rack 48 secured to the positioner assembly 28. The pinion 46 is driven by a multiphase DC brushless positioner motor 50.

Figure 2:
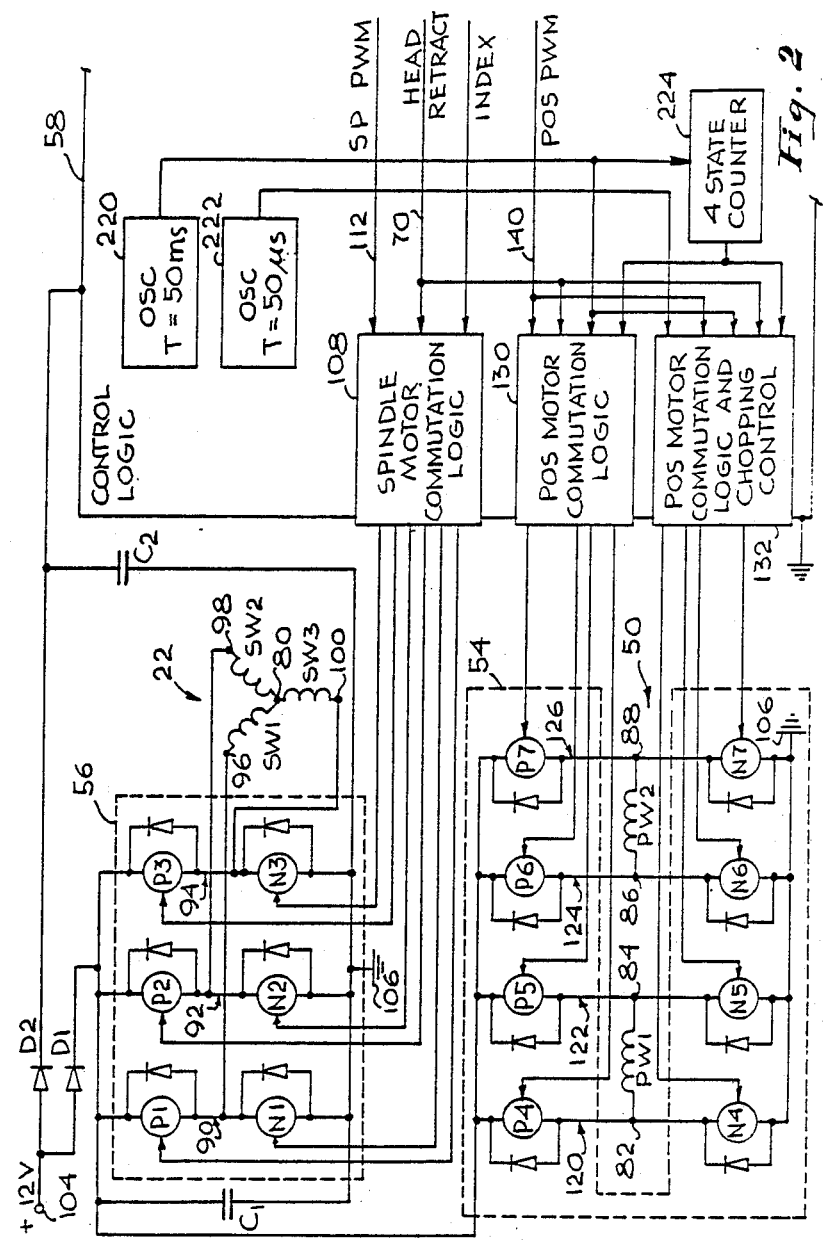
FIG. 2 is a block diagram depicting the automatic head retract system of the present invention.
Figure 3:
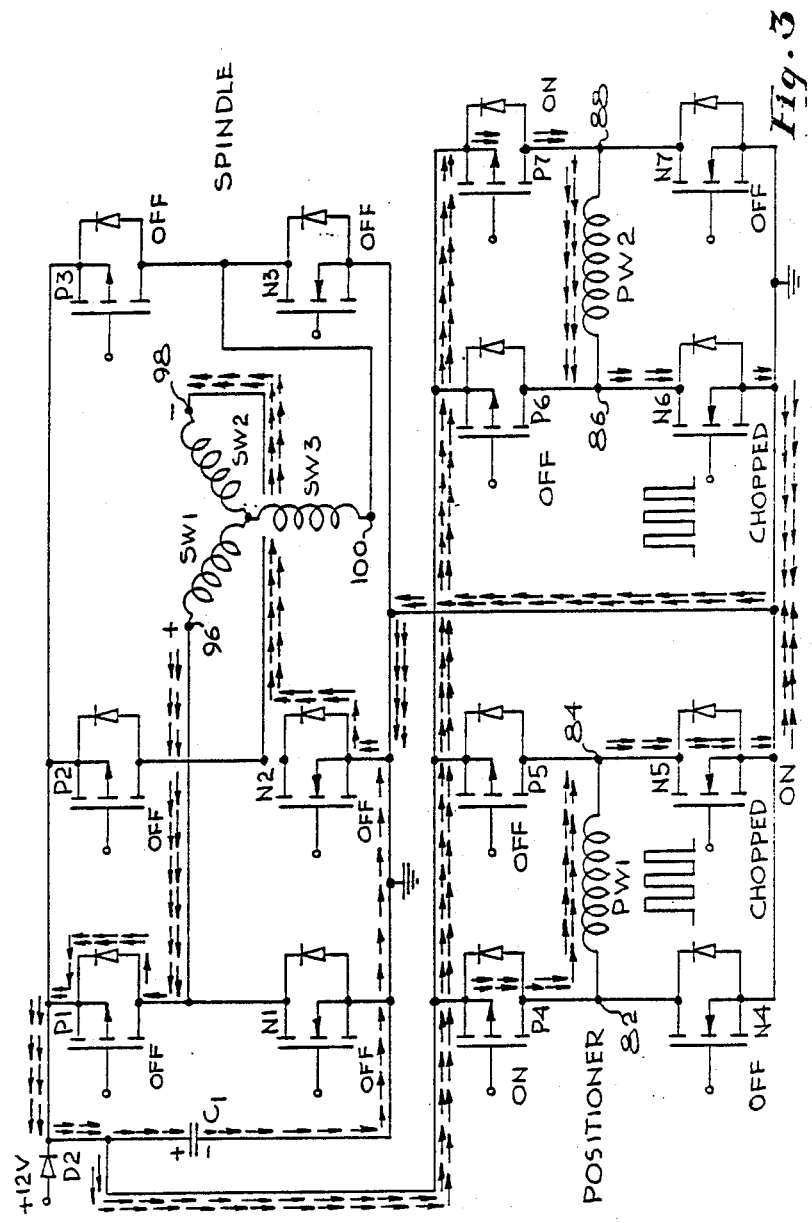
FIG. 3 is a circuit diagram depicting the current flow for the spindle motor and positioner motor during a head retract operation.

The positioner motor 50 and spindle motor 22 are respectively driven by drive electronics 54 and 56 which are depicted in greater detail in FIGS. 2 and 3.

The drive electronics 54, 56 is controlled by control logic unit 58 in response to disk drive microprocessor 50. In normal operation, the microprocessor 60 supplies a track address to control logic unit 58. The control logic unit 58 then energizes the positioner motor 50 via drive electronics 54 to move the positioner assembly 28 a certain number of tracks inwardly or outwardly. A track counter 62 counts the track movement of the positioner assembly 28 and communicates it back to control logic 58. When the positioner assembly is correctly positioned with the heads over a desired track, data can be written to or read from the disk surface via read/write head electronics unit 66 which connects the control logic unit 58 to each of the heads 34. A sensor 68 is provided to detect an origin or index point on the spindle for speed control purposes, via control logic 58, as well as commutation signals for correctly commutating the spindle motor windings, via drive electronics 56.

The present invention is particularly directed to improvements in the disk drive unit 10 for responding to a voltage fault (or other emergency condition), to shut down the drive unit while minimizing the probability of damaging the disk surfaces or heads. In accordance with the invention, a head retract command is supplied to the control logic 58 by line 70, in response to various possible conditions, simply depicted in FIG. 1A as being either (1) a voltage fault such as would occur on power turn off or sudden power loss or (2) some other emergency condition. It will be assumed herein that any such condition results in a complete loss of external electric power. Electric power loss normally represents a potentially catastrophic condition in that without power, the spindle motor 22 will slow and the heads flying on the air bearing generated by the rotating disks will come into contact with the disk surface for a prolonged time resulting in head and disk wear and potential disk surface damage. An uncontrolled head crash will quite likely destroy any data on that area of the disk surface and under some circumstances might damage the disk surface and/or head. The objective of the present invention is to operate the positioner motor 50 in a controlled manner, in the absence of continuing external power, to move the heads inwardly to the landing zone 40 whereat they can land on the disk surface in a data free area. Moreover, in accordance with the invention, when the heads reach the landing zone, a latch mechanism 74 is activated to latch the heads 34 in the landing zone 40. Thereafter, the spindle motor 22 is braked. As will be discussed hereinafter, upon the restoration of electric power, the latch 74 can be reset and the positioner motor 50 energized to move the heads 34 outwardly to the data zone.

Attention is now directed to FIG. 2 which shows a preferred embodiment of the control logic 58, spindle motor 22, spindle motor drive electronics 56, positioner motor 50, and positioner motor drive electronics 54, of FIG. 1A. In accordance with the preferred embodiment, the spindle motor 22 comprises a multiphase DC brushless motor including three drive windings SW1, SW2, and SW3 connected in a WYE (as depicted) or delta configuration. That is, the first terminals of windings SW1, SW2, and SW3 are connected in common at junction 80. The second terminal of each of the windings SW1, SW2, and SW3 is connected to the drive electronics 56 in a manner to be discussed hereinafter.

The positioner motor 50 of the preferred embodiment comprises a DC brushless motor having two drive windings PW1 and PW2. Winding PW1 has terminals 82 and 84 which are connected to the positioner motor drive electronics 54 in a manner to be discussed hereinafter. Similarly, the positioner motor winding PW2 has terminals 86 and 88 also connected to the drive electronics 54 in a manner to be discussed hereinafter.

The spindle motor drive electronics 56 essentially comprises a switching means including three parallel paths 90, 92, and 94 each comprised of first and second series connected switches. Thus, path 90 is represented as including series connected switches P1 and N1 with the second terminal 96 of spindle motor winding SW1 connected to the junction therebetween. Similarly, the second terminal 98 of spindle motor winding SW2 is connected to the junction between series connected switches P2 and N2 of path 92. Second terminal 100 of spindle motor winding SW3 is connected to the junction between switches P3 and N3 of path 94. Note that paths 90, 92, and 94 are connected in parallel between a DC voltage source 104 (nominally +12 volts) via diode D1 and a DC reference voltage (depicted as ground) 106.

In the normal operation of the spindle motor 22, the switches P1, P2, P3, N1, N2, and N3 are selectively enabled by spindle commutation logic 108 of control logic 58 to energize the spindle motor windings in a predetermined sequence to drive the spindle motor in the desired direction. The speed of the spindle motor is preferably controlled by pulse width modulating the on times of the spindle motor switches as directed by a command supplied to the spindle commutation logic 108 via line 112.

The positioner motor switching means 54 of the preferred embodiment includes four parallel paths 120, 122, 124, and 126 each comprised of series connected switches. Thus, path 120 is comprised of switches P4 and N4 with winding terminal 82 connected to the conjunction therebetween. Winding terminal 84 is connected between switches P5 and N5 of path 122. Terminal 86 of winding PW2 is connected between switches P6 and N6 of path 124 and its terminal 88 is connected between series connected switches P7 and N7 of path 126. The paths 120, 122, 124, and 126 are connected in parallel between DC voltage source 104 and DC voltage reference 106. Switches P4, P5, P6, P7 are controlled by positioner motor commutation logic 130 of control logic block 58. Switches N4, N5, N6, and N7 are controlled by positioner motor commutation logic and chopping control 132, also part of control logic 58. In normal operation the switches P4–P7 and N4–N7 are selectively enabled to energize the windings PW1 and PW2 in accordance with a first predetermined sequence to rotate the motor in a first direction to move the positioner assembly 28 inwardly. The windings PW1 and PW2 are energized in accordance with a second predetermined sequence to rotate the motor in an opposite direction to move the positioner assembly 28 outwardly.

Inasmuch as the present invention is directed primarily to an improved method and apparatus for responding to a voltage fault condition, the normal operation of the disk drive unit 10 will not be discussed in great detail. Suffice it to understand that in response to a track address command from the host computer 12, the disk drive microprocessor 60 will determine the direction and number of tracks that the positioner assembly 28 must be moved to position the heads over the addressed track. Based upon the magnitude of the movement required, a certain velocity profile for the positioner motor will be selected and the positioner motor commutation logic 130 and 132 will then energize the windings PW1 and PW2 by controlling the switching means 4 to move the positioner motor in accordance with the selected velocity profile. The speed with which the positioner motor is driven is preferably controlled by two pulse width modulation commands, one for each positioner motor winding, supplied via command lines 140.

As previously mentioned, an object of the invention is to respond to a voltage fault condition to move the heads from whatever track they might be on to a landing zone on the disk surface without the benefit of external electric power. To successfully perform this function, it is necessary that it be executed rapidly and with very little power consumption. In accordance with the invention, this head retract operation is accomplished by capacatively storing a certain amount of energy during normal operation of the drive unit which energy is later used to control logic 58 during the head retract operation and additionally to use the back EMF of the coasting spindle motor 22 to provide the energy to the positioner motor.

More specifically, note that FIG. 2 depicts a capacitor means comprised of capacitors C1 and C2. It is pointed out that although separate capacitors C1, C2 are shown for convenience, a single capacitor of appropriate value could be readily substituted. Note that capacitor C1 is connected in parallel with paths 90, 92, 94 of switching means 56 between voltage source 104, via diode D1, to ground 106. This, of course, also connects capacitor C1 in parallel with each of paths 120, 122, 124, 126 of switching means 54. Capacitor C2 is connected in series with diode D2 between source 104 and ground 106. With the capacitor means C1 and C2 so connected, it will be apparent that during the normal operation of the disk drive unit 10, each of the capacitors will charge to the level of the voltage source 104 (neglecting diode drops).

In order to retract the heads to the landing zone under any conditions, i.e. regardless of where the heads may be or in what direction or at what speed they may be moving, when a voltage fault occurs, it is important that the head retract operation be accomplished with the expenditure of very little power. Accordingly, the switching means 54 and 56 are preferably implemented with low power consuming complementary metal oxide semiconductor field effect transistors (CMOS FETS). Thus, the aforementioned switches P1 through P7 are intended to represent P channel FETS as depicted in FIG. 3. Similarly, aforementioned switches N1–N7 are intended to represent N channel FETS also as depicted in FIG. 3. It is pointed out that FIG. 2 shows each of the aforementioned N and P switches as having a diode connected in parallel therewith. An effective diode bypass typically inherently exists as a consequence of the fabrication process of most CMOS FET fabrication procedures. This inherent diode bypass may be sufficient in most embodiments of the invention However, depending upon the parameters and specific requirements of any particular disk drive unit, it may be necessary to expressly provide bypass diodes for each of the FET switches.

FIG. 2 depicts those portions of the control logic block 58 which are used to execute the head retract operation in accordance with the invention. The head retract operation is initiated in response to an enabling signal appearing on the head retract line 70 depicted in FIGS. 1A and 2. The line 70 is shown as being coupled to the spindle motor commutation logic 108, the positioner motor commutation logic 130, and the positioner motor commutation logic and chopping control 132. The operation of the system in response to the head retract enable signal is generally described by the flow chart of FIG. 4A and the timing chart of FIG. 4B. Note that the head retract operation involves two successive operational modes; namely, (1) a head retraction mode in which the heads are moved to the landing zone and (2) a spindle brake mode in which the spindle motor is brought to a stop.

Figure 4A:
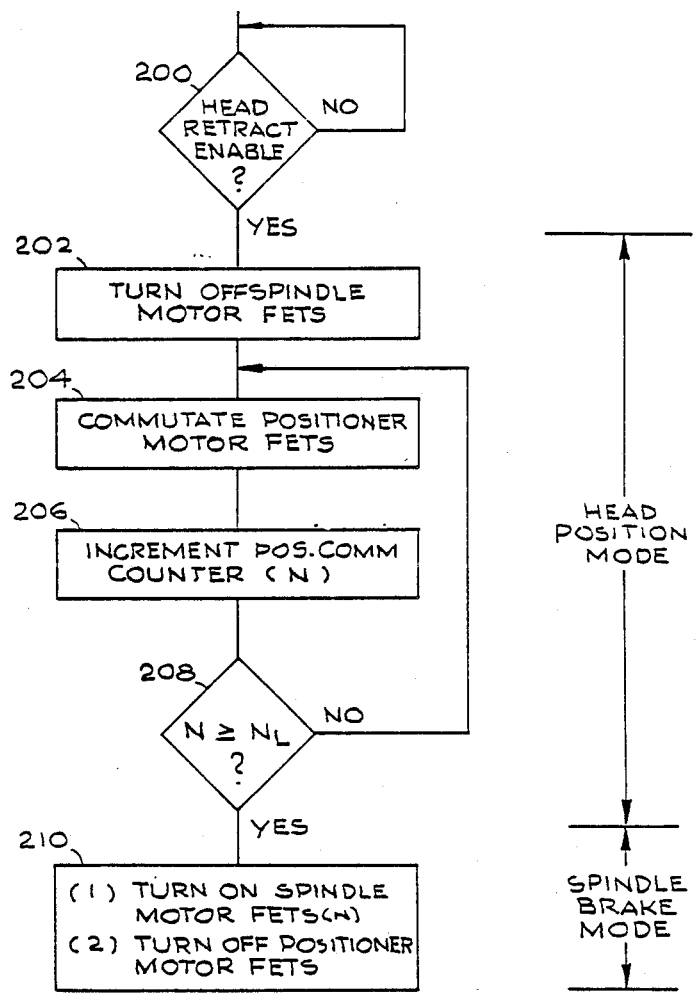
FIG. 4A is a simplified flow chart depicting the operation of an automatic head retract system in accordance with the invention and FIG. 4B comprises a timing diagram relating to the flow chart of FIG. 4A.
Figure 4B:
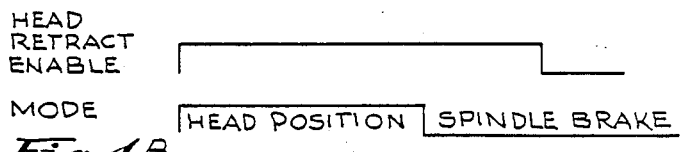

Referring more specifically to the flow chart of FIG. 4A note that the head retract line 70 is continually monitored (block 200) to determine whether a head retract enable signal occurs. If yes, then the spindle motor FET switches are immediately turned off (block 202). As will be seen in connection with FIG. 3, this action enables the switching means 56 to essentially act as a rectifier to apply the back EMF produced by the coasting spindle motor to charge the capacitor C1. With the spindle motor FET switches turned off, the positioner motor commutation logic 130 and 132 is operated in a conventional stepper motor sequence t move the heads toward the landing zone. This is represented by block 204. As the heads are moved toward the landing zone, a commutation counter (N) is incremented (block 206). Decision block 208 monitors whether the commutation counter N equals or exceeds the maximum number of commutation steps $N_L$ necessary to move the heads from the outermost position to the innermost position (landing zone). If no, the positioner motor commutation logic continues to move the heads toward the landing zone. If yes, then the positioner motor FET switches are turned off and the spindle motor FET switches N1, N2, N3 are turned on to effectively short circuit the spindle motor windings and thus brake the spindle motor (block 210).

With the foregoing simplified explanation of the retract operation in mind, attention is again called to the control logic block 58 of FIG. 2 and specifically to the inclusion of a first low frequency oscillator 220 and a second higher frequency oscillator 222. Note that oscillator 220 has a nominal period of 50 milliseconds whereas oscillator 222 has a nominal period of 50 microseconds. The output of oscillator 220 is applied to a counter 224 which iteratively defines four states to successively step the positioner motor to move the positioner assembly 28 toward the landing zone at a controlled speed in a conventional stepper motor sequence. For example,

|     | PW1 | PW2 |
| --- | --- | --- |
| (1) | +   | −   |
| (2) | −   | −   |
| (3) | −   | +   |
| (4) | +   | +   |

While this is occurring, the output of oscillator 222 is applied to the positioner motor commutation logic and chopping control 132. The oscillator 222 causes the switches N4 through N7 to be interrupted or chopped at a very high rate to optimize the energy transfer from the coasting spindle motor 56 to the positioner motor 54.

Attention is now directed to FIG. 3 which illustrates the current flow for a typical positioner motor state (state 1) during the head retract operation. Note that during state (1) current through positioner motor winding PW1 is positive (from terminal 82 to terminal 84) and through winding PW2 is negative (from terminal 88 to terminal 86). In order to achieve this current flow, switches P4 and N5 are turned on and switches P5 and N4 are turned off. Further, switches P7 and N6 are turned on and switches P6 and N7 are turned off. Note that although switches N5 and N6 are on, current flow therethrough is chopped by the output of the aforementioned high frequency oscillator 222.

Current is supplied to the positioner motor windings PW1, PW2 from capacitor C1 and the back EMF of the spindle motor windings. Recall that all of the spindle motor FET switches are off during the head retract operational mode. Assuming the instantaneous polarity represented in FIG. 3 with winding terminal 96 positive relative to terminal 98, conventional current will flow through the diode bypass around P1 to supply current to the capacitor C1 and to the positioner motor windings PW1, PW2. The return path for current to spindle motor winding terminal 98 is via the ground reference voltage path and through the diode bypass of spindle motor switch N2. As the spindle motor rotates, the back EMF will of course be generated across different ones of the winding terminals but the spindle motor switch means will continue to essentially act as a rectifier, in the manner depicted in FIG. 3, to apply the back EMF in the correct direction to sustain the charge on capacitor C1 and to supply current to the positioner motor. The configuration of the positioner motor switches will be sequenced by the aforementioned four state counter 224 to continue to move the heads inwardly until they reach the landing zone as determined by decision block 208 of FIG. 4A.

It will be recalled from FIG. 1A that, in accordance with the invention, a latch 74 is provided to latch the heads in the landing zone so that they can be held in place, without any electrical power, in order to avoid any damage to the heads or disk surface during the power off period. This feature is extremely useful when the disk drive unit 10 is used in a portable microcomputer, for example, in that it assures that whenever electric power is removed, the heads are automatically moved to the landing zone and locked in position. Inasmuch as latching occurs after the loss of external electric power, it is important that the latching operation occur automatically and involve a very efficient expenditure of electric power. It is additionally important that the latch mechanism not consume any electric power during the normal usage of the disk drive unit and also that the positioner assembly not have to work against any spring force which would require the positioner motor to expend power. A further desirable attribute for the latch mechanism is the ability to be reset to unlatch the positioner assembly with the application of a short electrical pulse.

Figure 6:
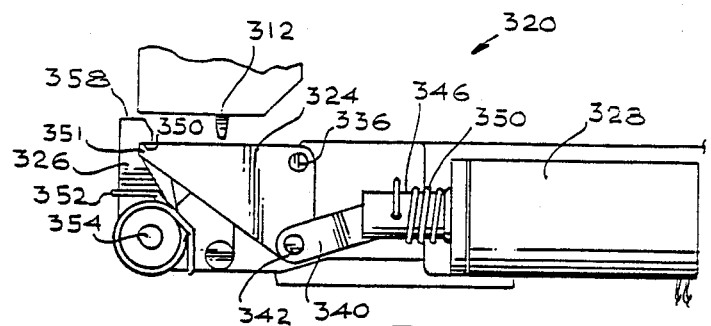
FIG. 6 is an enlarged plan view of the latch mechanism in its set condition showing the carriage pin about to be latched.
Figure 8:
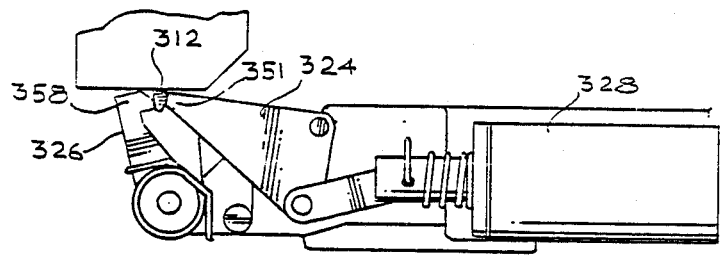
FIG. 8 is a plan view similar to FIG. 6 showing the carriage pin latched by said latch mechanism.
Figure 7:
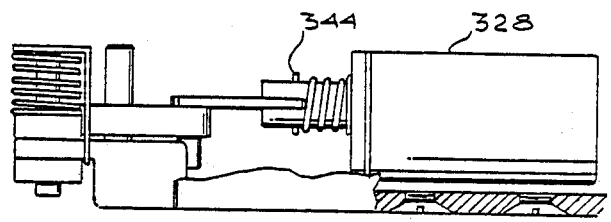
FIG. 7 is a side view of the latch mechanism of FIG. 6.

Attention is now called to FIGS. 5, 6, 7, and 8 which depict a preferred latch mechanism which satisfies the aforementioned requirements. FIG. 5 comprises a plan view of a head-disk assembly 300 depicting the upper disk 24 mounted for rotation within an assembly casing 302. Note that the position motor 50 is mounted on the casing with the positioner motor shaft extending through the casing and carrying the aforementioned pinion 46. The pinion 46 is engaged with a rack 48 secured to a carriage portion 308 of the aforementioned positioner assembly 28. The carriage 308 is mounted for reciprocal linear movement along rail 310. Secured to the carriage, but not shown in FIG. 5, are additional portions of the positioner assembly such as the fingers 32 and heads 34. FIG. 5, however, does depict a latch actuating pin 312 which is mounted on the carriage 308 extending substantially perpendicular to the carriage path along rail 310. A latch mechanism 320 is mounted immediately adjacent to the carriage path. The latch mechanism 320 is best depicted in FIGS. 6, 7 and 8 which illustrate the primary latch components including a carriage latch member 324, a keeper latch member 236 and a solenoid 328.

The carriage latch member 324 comprises a substantially triangular plate mounted for pivotal movement around the pivot pin 336. The carriage latch member 324 is also pivotally coupled to link 340 at pivot point 342. The other end of link 340 is connected via pivot pin 344 to rod 346 of solenoid 328. A spring 350 is mounted around rod 346 tending to push the rod to the left, as depicted in FIG. 6, to pivot the carriage latch member 324 clockwise about pin 336.

When the latch mechanism is set as depicted in FIG. 6, the position of the carriage latch member 324 is determined by the keeper latch member 326. That is, the keeper latch member 326 is shaped to define a recess 350 for receiving the end 351 of the carriage latch member 324 to retain it in the position depicted in FIG. 6. A spring 352 urges the keeper latch member in a clockwise direction about pivot pin 354 to hold the carriage latch member 324 when the latch mechanism is in its set condition.

As shown in FIG. 5, the latch mechanism 320 is mounted immediately adjacent to the path of the carriage 308. When in the set condition depicted in FIG. 6, the carriage latch member 324 is in its first, or counterclockwise, position in non interfering relationship with respect to the latch actuating pin 312 mounted on carriage 308. However, when the heads are moved to the landing zone in accordance with the aforedescribed procedure, the actuating pin 312 will engage the upwardly projecting head 358 of the keeper latch member 326 to pivot it counterclockwise as shown in FIG. 8. As a consequence, this will free the carriage latch member 324 to pivot clockwise around pin 336 under the urging of spring 350. Consequently, the latch actuating pin 312 will be captured between the keeper latch member 326 and the carriage latch member 324, as depicted in FIG. 8, thereby preventing the heads from leaving the landing zone.

Note that when the latch member 326 is in the set condition as depicted in FIG. 6, no electric power is consumed. Also note, that when in the set condition, the latch mechanism 320 has no effect on the carriage and thus produces no load on the positioner motor. Despite this non-interference of the latch mechanism with the normal operation of the positioner assembly, when the heads are 0 driven to the landing zone so that the pin 312 engages the keeper latch member 326, the latch mechanism 320 operates automatically without requiring electric power.

With the carriage latched in position as depicted in FIG. 8, in order to release the carriage for normal use upon restoration of electric power, it is merely necessary to provide a short pulse to the solenoid 328 to draw the rod 346 to thus pivot the carriage latch member 324 counterclockwise out of interfering relationship with the pin 312 and into the recess defined by the keeper latch member 326. This action then permits the carriage to be moved away from the latch 320 under the control of the positioner motor 50.

In embodiments of the invention using disks of 3.5 inch diameter, the carriage must travel about 1 inch. In a typical implementation, the pinion 46 and rack 48 will each have a pitch of about 120 teeth per inch. In order to actuate the latch mechanism 320, it is typically necessary for the pin 312 to exert a force in excess of 1 ounce. Inasmuch as the pinion 46 typically has a small radius (e.g. radius of pitch diameter equals 0.12 inch), this force can be readily obtained from a positioner motor 50 having a torque in excess of 0.2 ounce inch since the force coupled to pin 312 via the rack-pinion gear ratio is determined by F=motor torque/pinion radius.

From the foregoing, it should now be appreciated that a system has been disclosed herein for use in a disk drive unit which responds to a voltage fault condition to automatically drive the heads to a landing zone on the disk, in the absence of external electric power, while initially permitting the coasting spindle motor to maintain the heads flying and to generate a back EMF for operating the positioner motor and to maintain the charge on a capacitor. During the head retract operation, the speed of the positioner assembly is controlled by the positioner motor commutation logic which controls the positioner motor switches. As a further significant feature of the invention, a latch mechanism is provided to automatically latch the heads in the landing zone in order to prevent damage to the heads or disk surfaces when the spindle stops.

Although particular embodiments of the invention have been described and illustrated herein, it should be recognized that modifications and variations will occur to those skilled in the art and it is intended that the appended claims be interpreted to cover any such reasonably equivalent modifications and variations.

We claim:

1. A head latching system for use in a disk drive unit having a carriage mounted for reciprocal movement along a linear path for moving a head over a disk surface having an outer data zone and a concentric inner landing zone, said system comprising:

a pin projecting from said carriage and movable therewith inwardly and outwardly along said path;

a keeper latch member mounted for limited movement between a first position and a second position;

means mounting said keeper latch member adjacent to said path for enabling said pin to engage said keeper latch member as said pin moves inwardly to move said keeper latch member from said first to said second position;

a carriage latch member mounted adjacent to said path for movement between a noninterfering first position and an interfering second position whereat said carriage latch member blocks outward movement of said pin, said carriage latch member being mounted adjacent to said keeper latch member whereby said keeper latch member, when in said first position, retains said carriage latch member in said first position;

first spring means urging said carriage latch member to said second position, and reset means for moving said carriage latch member to said first position; and second spring means for urging said keeper latch member to said first position for retaining said carriage latch member in said first position.

* * * * *